(12) United States Patent
Cagata et al.

(10) Patent No.: US 8,127,489 B2
(45) Date of Patent: Mar. 6, 2012

(54) MARCOTTING DEVICE AND METHOD

(76) Inventors: Artemio N. Cagata, Louisville, KY (US); Ardel Cagata, Louisville, KY (US)

(*) Notice: Subject to any disclaimer, the term of this patent is extended or adjusted under 35 U.S.C. 154(b) by 88 days.

(21) Appl. No.: 12/705,750

(22) Filed: Feb. 15, 2010

(65) Prior Publication Data
US 2010/0205862 A1    Aug. 19, 2010

Related U.S. Application Data

(60) Provisional application No. 61/153,355, filed on Feb. 18, 2009.

(51) Int. Cl.
*A01G 7/00* (2006.01)
(52) U.S. Cl. .......................................................... 47/5.5
(58) Field of Classification Search ............... 47/5.5, 47/32.4, 65, 58.1 R, 1.01 R, DIG. 3; 220/4.22, 220/254.1, 254.3, 254.6, 254.7; 439/367
See application file for complete search history.

(56) References Cited

U.S. PATENT DOCUMENTS

| | | | | |
|---|---|---|---|---|
| 1,500,917 A * | 7/1924 | Bell | ............................. | 220/4.09 |
| 1,655,731 A * | 1/1928 | May, Jr. et al. | ................... | 47/73 |
| 1,708,752 A * | 4/1929 | Caras | ............................. | 47/84 |
| 1,838,702 A * | 12/1931 | Partridge | ....................... | 220/9.1 |
| 1,868,609 A * | 7/1932 | Lam | ................................ | 47/73 |
| 2,021,793 A * | 11/1935 | Lam | ................................ | 47/73 |
| 2,624,451 A * | 1/1953 | Ewing | ........................... | 206/541 |
| 3,052,062 A * | 9/1962 | Geisthoff | ........................ | 47/5.5 |
| 3,243,919 A * | 4/1966 | Carlson | ............................ | 47/79 |
| 4,048,754 A * | 9/1977 | Laux | ................................ | 47/68 |
| 4,216,622 A * | 8/1980 | Hollenbach et al. | ............. | 47/71 |
| 5,052,939 A * | 10/1991 | Koch | ............................. | 439/133 |
| 5,245,916 A * | 9/1993 | Elizondo et al. | ................. | 99/359 |
| 5,372,269 A * | 12/1994 | Sutton et al. | .................... | 220/62 |
| 6,099,340 A * | 8/2000 | Florentine | .................... | 439/367 |
| 7,189,100 B1 * | 3/2007 | Colbourne | ................... | 439/369 |
| 7,497,348 B2 * | 3/2009 | Johnson et al. | ............. | 220/4.22 |
| 2004/0097120 A1 * | 5/2004 | Limber et al. | ................ | 439/369 |
| 2006/0272208 A1 * | 12/2006 | Altman et al. | ................. | 47/66.1 |

FOREIGN PATENT DOCUMENTS

| EP | 21963 A1 * | 1/1981 |
|---|---|---|
| GB | 2057234 A * | 4/1981 |

* cited by examiner

*Primary Examiner* — Rob Swiatek
*Assistant Examiner* — Ebony Evans
(74) *Attorney, Agent, or Firm* — James Ray & Assoc

(57) ABSTRACT

A marcotting device includes a housing for housing a predetermined portion of branch therein. Such housing includes two sides hingedly attached to each other, an open first end formed when such sides are joined in a closed position, a pair of bottom members, each perpendicularly attached to one side closely adjacent a second end of such housing, each of such bottom members including a cut out portion such that when such sides are closed such bottom members align to form a housing bottom and such cut out portions form a first aperture therein. A cover member is engageable with such housing closely adjacent such first open end. An access mechanism connected to such housing enables water dissemination into such housing. A securing mechanism secures such housing on or around the branch, or a combination thereof.

15 Claims, 6 Drawing Sheets

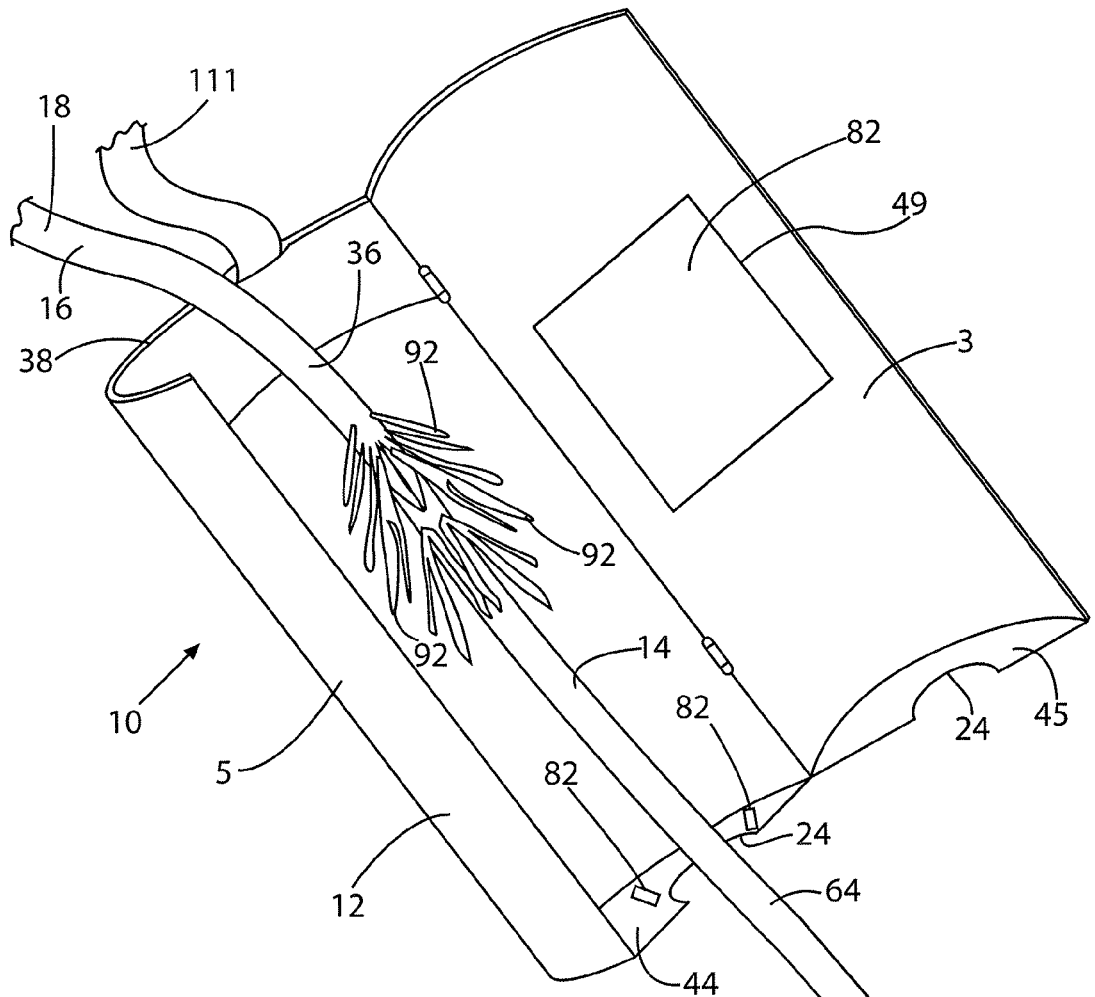
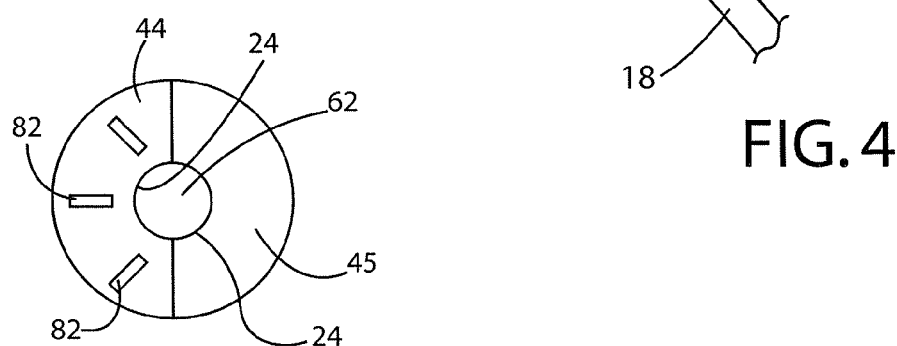
FIG. 4
FIG. 5

MARCOTTING DEVICE AND METHOD

CROSS REFERENCE TO RELATED APPLICATION

This patent application is related to and claims priority from U.S. Provisional Patent Application Ser. No. 61/153,355 filed Feb. 18, 2009.

FIELD OF THE INVENTION

The present invention relates, in general, to propagation of plants and, more particularly, this invention relates to a marcotting device and a method of using a marcotting device.

BACKGROUND OF THE INVENTION

Prior to the conception and development of the present invention, propagation, as is generally well known in the prior art, is a technique used to produce a new plant from a parent plant. Unlike seed planting, propagating a plant will result in an identical second plant that will reproduce the same flowers, blossoms, etc., and grow in the same manner as the parent plant. Often, however, propagation is difficult and time consuming. Usually propagation is accomplished by cutting, grafting, and budding techniques. Unfortunately, it isn't always easy to cut a plant properly such that a new plant will grow. Repeated attempts may be necessary to produce just one additional plant and during the process the parent plant can become damaged, ugly and unhealthy. Grafting and budding procedures are even more complex and can also result in damage to the parent plant.

Marcotting is another technique used for propagating trees and shrubs. During marcotting a branch on the parent plant is girdled down to the central hardwood and the cambial tissue surrounding the white central wood of the branch is removed. With proper care, new roots will grow on the upper bark of such branch about 1 to 1½ inches above the girdled portion. If the new roots grow and if they become strong enough the marcot (the new plant) is detached from the parent tree and planted on its own. Most individuals are unaware of the marcotting technique and many others won't even consider trying to grow a marcot because they think it too complex, especially since marcots are very delicate and often die or take long periods of time to become established.

SUMMARY OF THE INVENTION

The present invention provides a marcotting device. Such marcotting device includes a generally hollow housing member manufactured from a first predetermined material and having a first predetermined size and a first predetermined shape. Such housing member is for housing a predetermined portion of a predetermined branch of a predetermined plant therein. Such housing member includes two side members hingedly attached to each other for enabling a user to open such housing member to gain access to an interior thereof. An open first end is formed when such two side members are joined in a closed position. Such housing also includes a pair of bottom members; a first one of such bottom members being perpendicularly attached to a first side member closely adjacent a second end thereof and a second one of such bottom members being perpendicularly attached to a second side member closely adjacent a second end thereof, each of such bottom members including a cut out portion such that when such side members are joined in such closed position such bottom members are aligned to form a bottom of such housing member and such cut out portions of such bottom members align to form a first aperture for encircling a lower portion of such predetermined portion of such predetermined branch. A cover member has a second predetermined shape and a second predetermined size for releasably fitting within such housing member and being engageable thereto closely adjacent such first open end thereof, such cover member fitting at least partially around an upper portion of such predetermined portion of such predetermined branch. An access means is operably connected to such housing member for enabling such user to disseminate water there through into such interior portion of such housing member when such housing member is in such closed position. A securing means is engageable with at least one of such housing member, such predetermined branch, and a combination thereof, for securing such housing member at least one of on such predetermined branch, to such predetermined branch, around such predetermined branch, and a combination thereof.

According to another embodiment, a method of marcotting is provided. Such method includes the first step of providing a marcotting device including: a generally hollow housing member manufactured from a first predetermined material and having a first predetermined size and a first predetermined shape for housing a predetermined portion of a predetermined branch of a predetermined plant therein; two side members hingedly attached to each other for enabling a user to open such housing member to gain access to an interior thereof; an open first end formed when such two side members of such housing member are joined in a closed position; a pair of bottom members, a first one of such bottom members being perpendicularly attached to a first side member closely adjacent a second end thereof and a second one of such bottom members being perpendicularly attached to a second side member closely adjacent a second end thereof, each of such bottom members including a cut out portion such that when such side members are joined in such closed position such bottom members are aligned to form a bottom of such housing member and such cut out portions of such bottom members are aligned to form a first aperture for encircling a lower portion of such predetermined portion of such predetermined branch; a cover member having a second predetermined shape and a second predetermined size for releasably fitting within such housing member and being engageable thereto closely adjacent such first open end thereof such cover member fitting at least partially around an upper portion of such predetermined portion of such predetermined branch; an access means operably connected to such housing member, for enabling such user to disseminate water there through into such interior portion of such housing member when such housing member is in such closed position; and a securing means engageable with at least one of such housing member, such predetermined branch, and a combination thereof, for securing such housing member at least one of on such predetermined branch, to such predetermined branch, around such predetermined branch, and a combination thereof. Thereafter, such method includes the steps of choosing a predetermined branch on a predetermined plant, making about a four inch girdle on a predetermined portion of such predetermined branch, positioning such predetermined girdled portion of such predetermined branch within an interior portion of such marcotting device, securing such marcotting device to such predetermined branch via such securing means, providing a predetermined amount of at least one of soil, fertilizer, and a combination thereof, packing such predetermined amount of such at least one of such soil, such fertilizer, and such combination thereof around such predetermined girdled portion of such predetermined branch, closing such side members of such housing member, attaching such cover member to such housing member, providing a predetermined amount of water, introducing a predetermined amount of water into such interior portion of such housing member, continuing to introduce a predetermined amount of water into such interior portion of such housing member according to a predetermined schedule for a predetermined time period until roots have sprouted and grown from such predetermined portion of such predetermined branch to a predetermined length, removing such marcot device from such marcot branch, cutting such marcot branch just below such roots such that such marcot branch is disengaged from such predetermined branch just below such roots of such marcot branch, and planting such marcot branch in a predetermined location.

OBJECTS OF THE INVENTION

It is, therefore, one of the primary objects of the present invention to provide a marcotting device which is easy to use and which will produce a healthy marcot.

Another object of the present invention is to provide a marcotting device which can be utilized to propagate various plants, trees, and shrubs, thereby saving a user of such device money by enabling such user to propagate his or her plants instead of purchasing them.

Still another object of the present invention is to provide a marcotting device which can be used to propagate plants in a reduced amount of time.

Another object of the present invention is to provide an easy to use method of marcotting which can be followed by anyone wishing to propagate trees, shrubs, and plants.

Yet another object of the present invention is to provide a marcotting device which includes a means for adding water, soil, fertilizer, nutrients, and the like to an interior portion of the device.

In addition to the various objects and advantages of the present invention described with some degree of specificity above it should be obvious that additional objects and advantages of the present invention will become more readily apparent to those persons who are skilled in the relevant art from the following more detailed description of the invention.

BRIEF DESCRIPTION OF THE DRAWINGS

FIG. 4 is a partial perspective of the invention according to one embodiment of the invention in which a predetermined portion of a predetermined branch is illustrated within an interior portion of such housing and roots are growing from the marcotted portion of such branch.

FIG. 5 is a partial perspective of the bottom members of the invention according to one embodiment of the invention.

Figure 1:
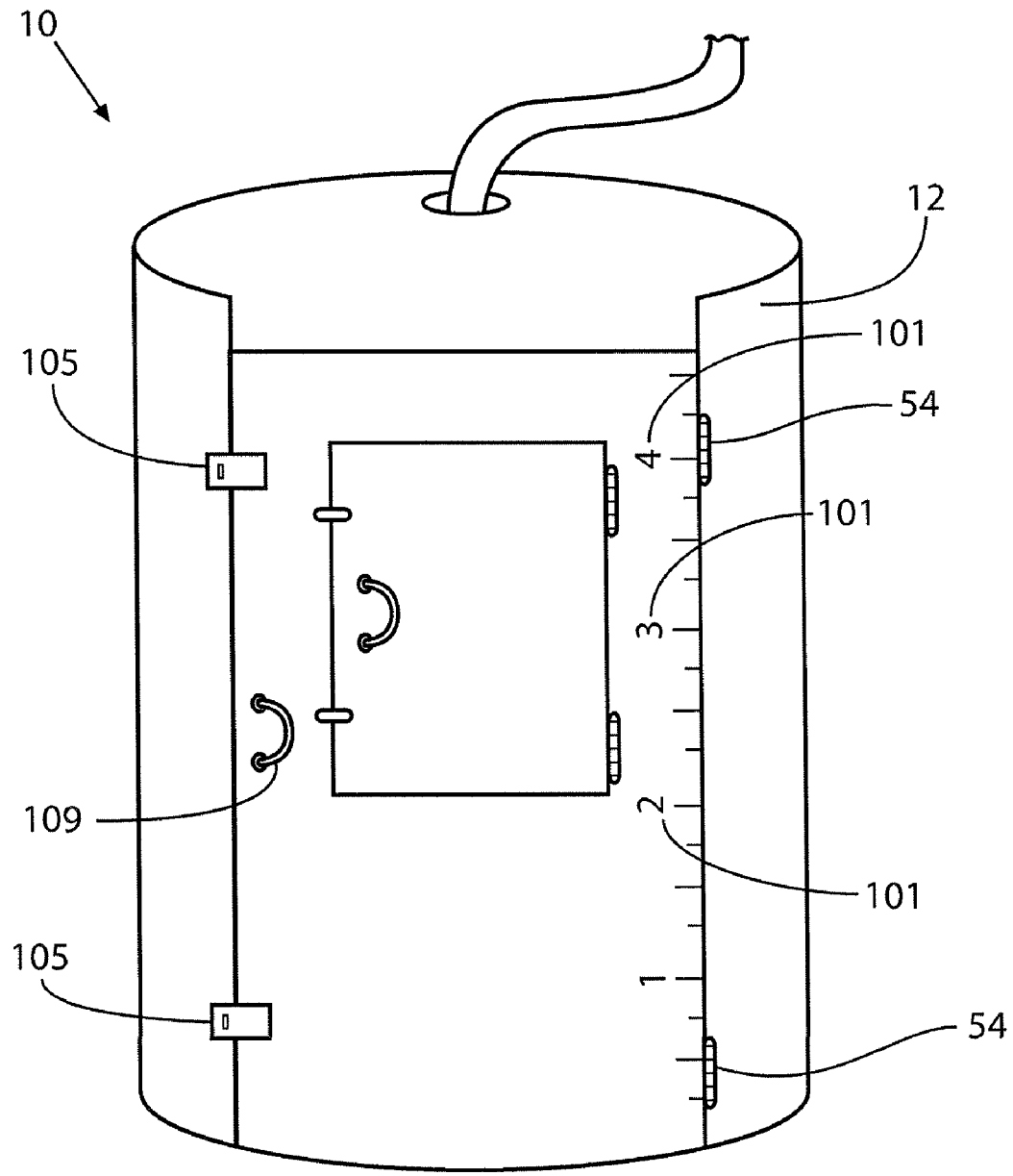
FIG. 1 is a partial perspective of the invention according to one embodiment of the invention.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Reference is now made, more particularly, to FIGS. 1-9.

A marcotting device is provided. Such marcotting device, generally designated 10, includes a generally hollow housing member 12 manufactured from a first predetermined material and having a first predetermined size and a first predetermined shape. Such housing member 12 is for housing a predetermined portion 14 of a predetermined branch 16 of a predetermined plant 18 therein. Such predetermined plant 18 is preferably at least one of a tree, a bush, a shrub, and a combination thereof.

It is presently preferred that such housing member 12 is substantially cylindrical. It is further presently preferred that such housing member 12 is between about 5.5 inches and about 6.5 inches long and wherein such housing member 12 has a diameter of between about 3.5 inches and about 4.5 inches.

Figure 2:
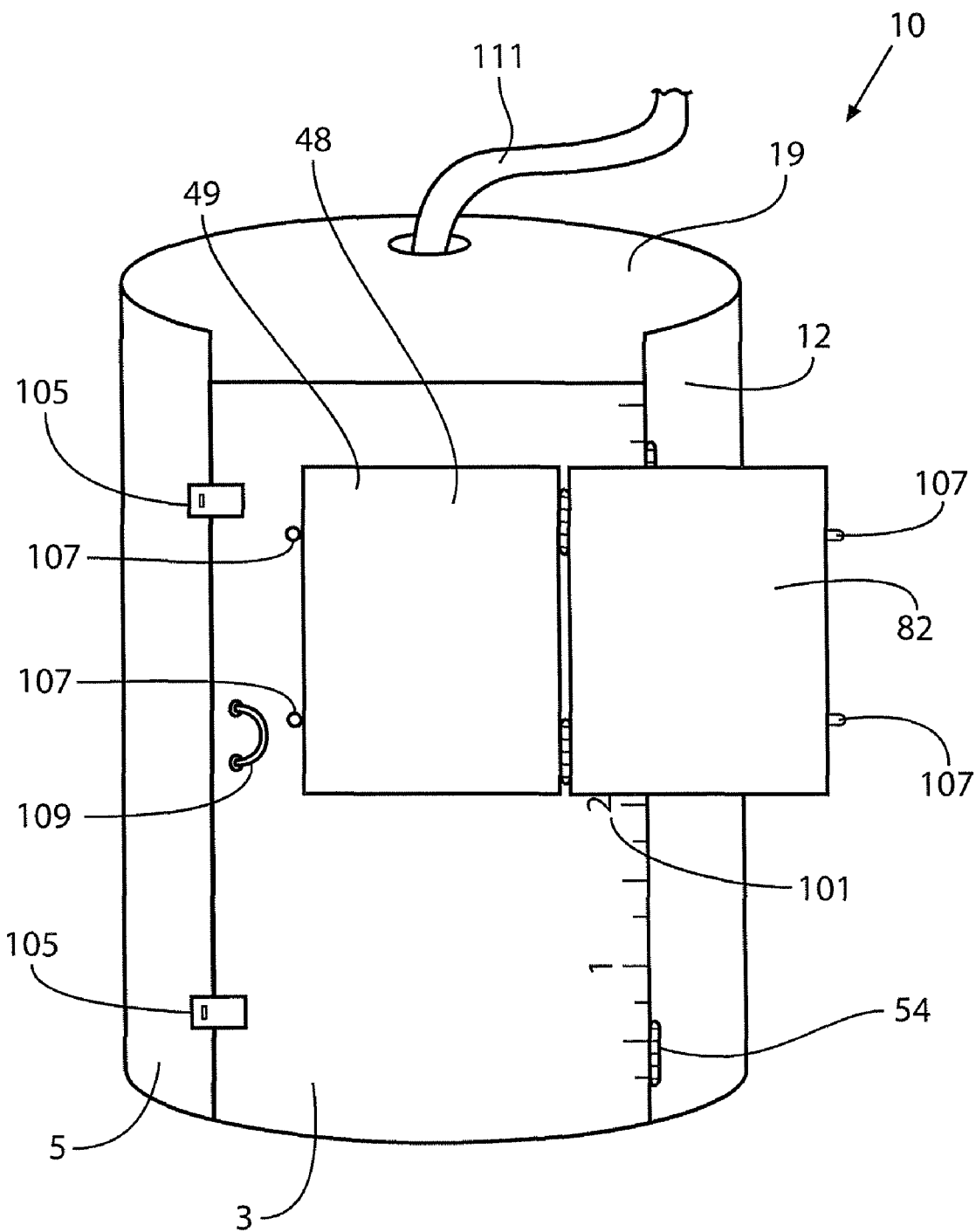
FIG. 2 is a partial perspective of the invention according to one embodiment of the invention.

It is further presently preferred that such housing member 12 includes predetermined indicia 101 disposed thereon as shown in FIGS. 1 and 2. Preferably, such predetermined indicia 101 includes at least one of instructions, measurement markings, and a combination thereof. Preferably such predetermined indicia 101 includes measurement markings, such measurement markings including at least one of measurement markings according to the Metric System, and measurement markings according to the U.S. Customary System of Measures, and a combination thereof.

Additionally, it is presently preferred that such first predetermined material is at least one of plastic, metal, wood, and a combination thereof. It is presently most preferred that such first predetermined material is plastic, preferably transparent plastic, such plastic having a predetermined thickness, preferably about 1/10 of an inch. It is meant that such plastic be weather resistant.

Such housing member 12 includes two side members hingedly attached to each other for enabling a user (not shown) to open such housing member 12 to gain access to an interior thereof. A first one of such side members is designated 5 and a second one of such side members is designated 3. Such side members may also be releasably engageable with each other via releasable hinges 54.

An open first end 19 is formed when such two side members 3 and 5 are joined in a closed position. It is presently preferred that such marcotting device 10 further includes a first locking means 105 engageable with such side members for enabling such user to selectively lock such housing member 12 in such closed position. It is also presently preferred that a handle member 109 is disposed on an outside portion of a predetermined one of such side members at a predetermined location. Such handle member 109 will aid such user in opening and closing such side members.

Such housing member 12 also includes a pair of bottom members; a first one 44 of such bottom members being perpendicularly attached to a first side member 5 closely adjacent a second end thereof and a second one 45 of such bottom members being perpendicularly attached to a second side member 3 closely adjacent a second end thereof, each of such bottom members including a cut out portion 24 such that when such side members are joined in such closed position such bottom members are aligned to form a bottom of such housing member 12 and such cut out portions 24 of such bottom members align to form a first aperture 62 for encircling a lower portion of such predetermined portion 14 of such predetermined branch 16. Such first aperture 62 preferably has a diameter of about 1.0 inch for encircling a bottom end 64 of such predetermined portion of such predetermined branch. It is presently preferred that at least one of such bottom members further includes a second plurality of apertures 82 disposed there through for permitting water to pass there through and out of such interior portion of such housing member 12.

A cover member 23 has a second predetermined shape and a second predetermined size for releasably fitting within such housing member 12 and being engageable thereto closely adjacent such first open end 19 thereof. Such cover member 23 fits at least partially around an upper portion 36 of such predetermined portion 14 of such predetermined branch 16. Such cover member 23 is preferably engageable with such housing member 12 about 1.5 inches below a top edge 38 of such first open end of such housing member 12. Such cover member 23 preferably further includes a first plurality of apertures 42 disposed there through. It is further presently preferred that such cover member 23 includes a first portion 26 and a second portion 28, each being engageable with at least one of a respective side member of such housing member, each other, and a combination thereof. Such first portion 26 and such second portion 28 of such cover member 23 each include a curved cut out section 32 at a center thereof such that when such first portion and such second portion are aligned within such housing member 12, such curved cut out sections align with one another and a second aperture 34 is formed at a center thereof for encircling such upper portion 36 of such predetermined portion 14 of such predetermined branch 16 disposed within such housing member 12.

An access means 48 is operably connected to such housing member 12 for enabling such user to disseminate water there through into such interior portion of such housing member 12 when such housing member 12 is in such closed position. It is presently preferred that such access means 48 is a third aperture 49 as illustrated in FIG. 2, disposed through a predetermined one of such side members for enabling such user to pour water there through.

Figure 3:
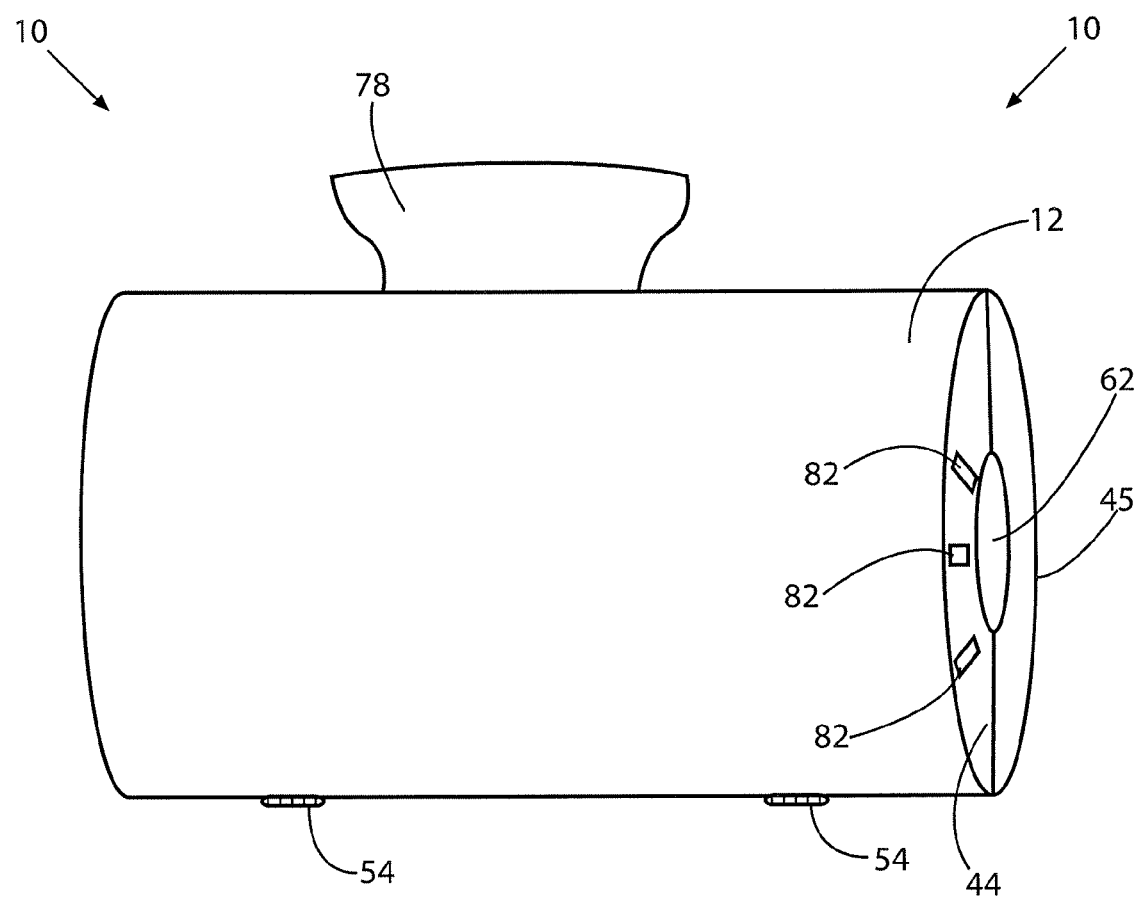
FIG. 3 is a partial perspective view of the invention according to one embodiment of the invention.

According to one embodiment, such third aperture 49 includes a lip member 78, as illustrated in FIG. 3, extending outwardly along a predetermined portion of a perimeter thereof in a flared manner for directing flow of water into the interior of such housing member 12. Preferably such lip member has a height of about 2.0 inches.

According to another embodiment, it is presently preferred that a shutter member 82 is hingedly attached to such housing member 12 closely adjacent such third aperture 49 such that such shutter member 82 may be selectively opened and closed by such user. It is presently preferred that such marcotting device 10 further includes a second locking means 107 engageable with such housing member 12 and such shutter member 82 for enabling such user to selectively lock such shutter member 82 in a closed position covering such third aperture 49.

Figure 6:
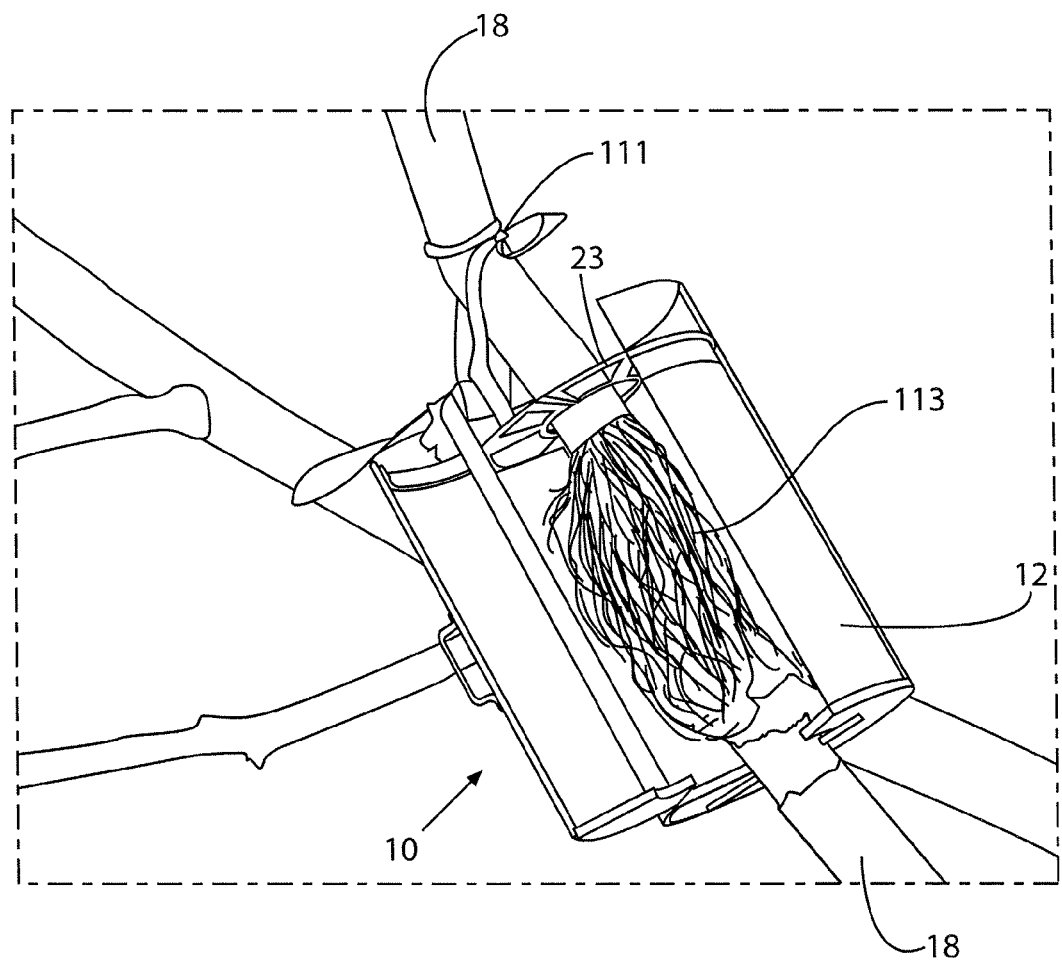
FIG. 6 is a partial perspective of the invention according to one embodiment of the invention; in this figure predetermined materials are illustrated packed around the marcotted branch within the interior of such housing member.
Figure 7:
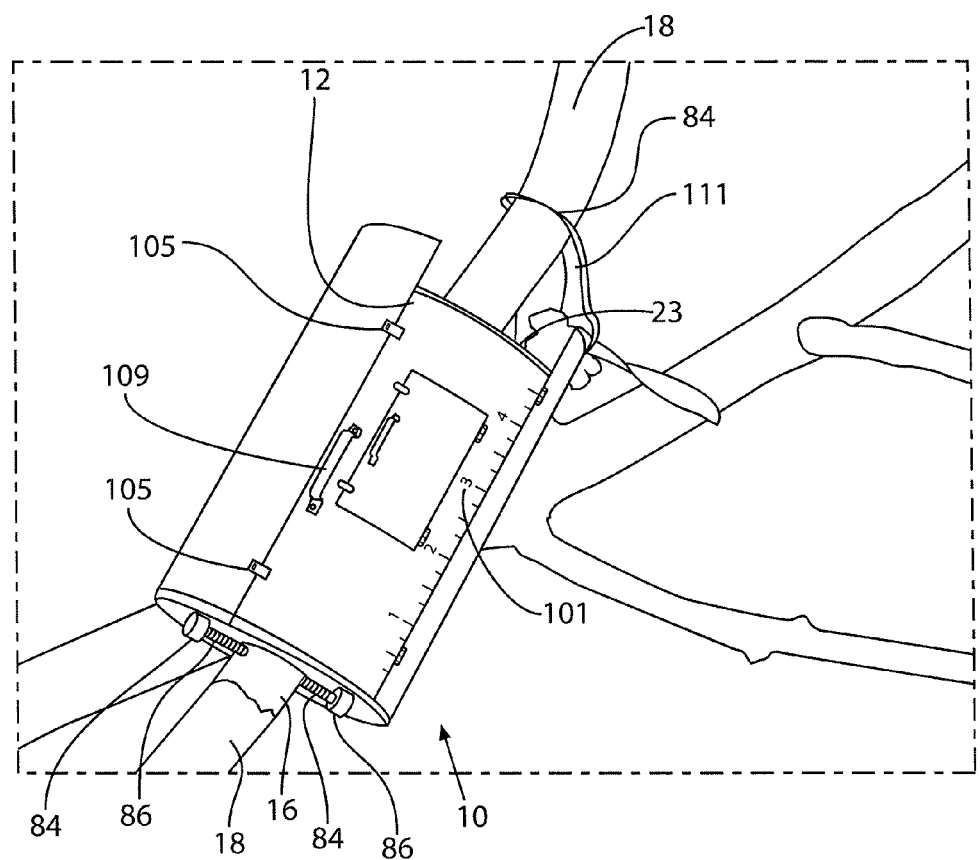
FIG. 7 is a partial perspective of the invention according to one embodiment of the invention.
Figure 8:
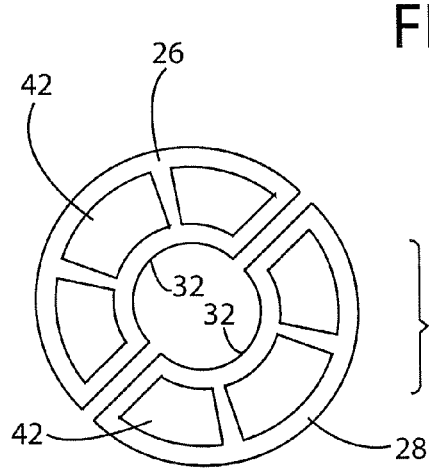
FIG. 8 is a partial perspective of the cover member of the invention according to one embodiment of the invention.
Figure 9:
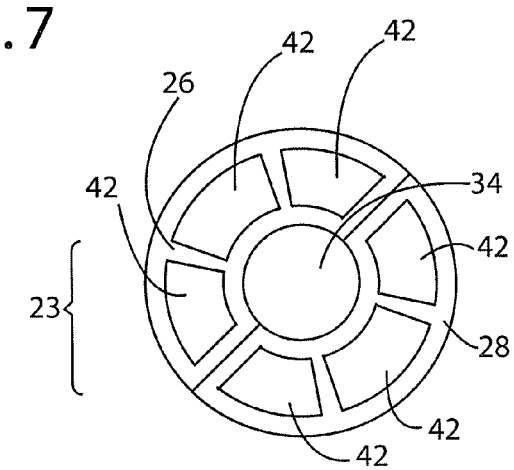
FIG. 9 is a partial perspective of the cover member of the invention according to one embodiment of the invention.

A securing means 84 is engageable with at least one of such housing member 12, such predetermined branch 16, and a combination thereof, for securing such housing member 12 at least one of on such predetermined branch 16, to such predetermined branch 16, around such predetermined branch 16, and a combination thereof. It is presently preferred that such at least one securing means 84 is at least one of a screw type securing means 86, a strap type securing means 111, and a combination thereof. It is presently preferred that such at least one securing means 84 includes both a screw type securing means 86 and a strap type securing means. As illustrated in FIG. 7 both a strap type securing means and a screw type securing means have been implemented to secure the device in position on such predetermined branch. Preferably two screws are provided for screwing into such predetermined branch 16 closely adjacent an outer portion of such second end of such housing member 12 and a strap type securing means 111 is engageable with such housing member 12 and such predetermined branch 16. It is meant that a user of such marcotting device 10 choose a branch from which to cultivate a marcot, girdle the branch to the central hardwood, secure the device 10 in place and insert predetermined materials 113, as shown in FIG. 6, such as soil, fertilizer, and other nutrients and packing into the housing member 12 and around the branch, then carefully monitor the branch within the device 10 administering to the branch's needs and keeping such soil moist at all times until new roots 92, as those shown in FIG. 4, have sufficiently grown such that the marcot can be transplanted.

According to another embodiment, a method of marcotting is provided. Such method includes the first step of providing a marcotting device including: a generally hollow housing member manufactured from a first predetermined material and having a first predetermined size and a first predetermined shape for housing a predetermined portion of a predetermined branch of a predetermined plant therein; two side members hingedly attached to each other for enabling a user to open such housing member to gain access to an interior thereof; an open first end formed when such two side members of such housing member are joined in a closed position; a pair of bottom members, a first one of such bottom members being perpendicularly attached to a first side member closely adjacent a second end thereof and a second one of such bottom members being perpendicularly attached to a second side member closely adjacent a second end thereof, each of such bottom members including a cut out portion such that when such side members are joined in such closed position such bottom members are aligned to form a bottom of such housing member and such cut out portions of such bottom members are aligned to form a first aperture for encircling a lower portion of such predetermined portion of such predetermined branch; a cover member having a second predetermined shape and a second predetermined size for releasably fitting within such housing member and being engageable thereto closely adjacent such first open end thereof such cover member fitting at least partially around an upper portion of such predetermined portion of such predetermined branch; an access means operably connected to such housing member, for enabling such user to disseminate water there through into such interior portion of such housing member when such housing member is in such closed position; and a securing means engageable with at least one of such housing member, such predetermined branch, and a combination thereof, for securing such housing member at least one of on such predetermined branch, to such predetermined branch, around such predetermined branch, and a combination thereof. Thereafter, such method includes the steps of choosing a predetermined branch on a predetermined plant, making about a four inch girdle on a predetermined portion of such predetermined branch, positioning such predetermined girdled portion of such predetermined branch within an interior portion of such marcotting device, securing such marcotting device to such predetermined branch via such securing means, providing a predetermined amount of at least one of soil, fertilizer, and a combination thereof, packing such predetermined amount of such at least one of such soil, such fertilizer, and such combination thereof around such predetermined girdled portion of such predetermined branch, closing such side members of such housing member, attaching such cover member to such housing member, providing a predetermined amount of water, introducing a predetermined amount of water into such interior portion of such housing member, continuing to introduce a predetermined amount of water into such interior portion of such housing member according to a predetermined schedule for a predetermined time period until roots have sprouted and grown from such predetermined portion of such predetermined branch to a predetermined length, removing such marcot device from such marcot branch, cutting such marcot branch just below such roots such that such marcot branch is disengaged from such predetermined branch just below such roots of such marcot branch, and planting such marcot branch in a predetermined location. It is preferred that such predetermined schedule includes watering such marcot branch at least once on the third day after attaching such marcotting device to such predetermined branch, and then every three days thereafter. It is further presently preferred that such marcotting device remain in position on such predetermined branch for between about six to about eight weeks. At that time it is expected that such marcot will be ready to be transplanted to its new location.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

We claim:

1. A marcotting device comprising:
   a. a generally hollow housing member manufactured from a first predetermined material and having a first predetermined size and a first predetermined shape for housing a predetermined portion of a predetermined branch of a predetermined plant therein, said housing member including;
      i. two side members hingedly attached to each other for enabling a user to open said housing member to gain access to an interior thereof;
      ii. an open first end formed when said two side members are joined in a closed position;
      iii. a pair of bottom members, a first one of said bottom members being perpendicularly attached to a first side member closely adjacent a second end thereof and a second one of said bottom members being perpendicularly attached to a second side member closely adjacent a second end thereof, each of said bottom members including a cut out portion such that when said side members are joined in a closed position said bottom members are aligned to form a bottom of said housing member and said cut out portions of said bottom members are aligned to form a first aperture for encircling a lower portion of said predetermined portion of said predetermined branch;
   b. a cover member having a second predetermined shape and a second predetermined size for releasably fitting within said housing member and being engageable thereto closely adjacent said first open end thereof said cover member fitting at least partially around an upper portion of said predetermined portion of such predetermined branch;
   c. a second aperture disposed through a predetermined one of said side members, said second aperture including a lip member extending outwardly along a predetermined portion of a perimeter thereof in a flared manner; and
   d. a securing means engageable with at least one of said housing member, said predetermined branch, and a combination thereof, for securing said housing member at least one of on said predetermined branch, to said predetermined branch, around said predetermined branch, and a combination thereof.

2. A marcotting device according to claim 1 wherein said cover member includes a first portion and a second portion, each being engageable with at least one of a respective side member of said housing member, each other, and a combination thereof.

3. A marcotting device according to claim 2 wherein said first portion and said second portion of said cover member each include a curved cut out section at a center thereof such that when said first portion and said second portion are aligned within said housing member said curved cut out sections align with one another and a third aperture is formed at a center thereof for encircling said upper portion of said predetermined portion of said predetermined branch disposed within said housing member.

4. A marcotting device according to claim 1 wherein said first predetermined size of said housing member is between about 5.5 inches long and about 6.5 inches long and wherein said housing member has a width of between about 3.5 inches and about 4.5 inches when in a closed position.

5. A marcotting device according to claim 1 wherein said first predetermined material is at least one of plastic, metal, wood, and a combination thereof.

6. A marcotting device according to claim 1 wherein said side members are releasably engageable with each other.

7. A marcotting device according to claim 1 wherein said housing member includes predetermined indicia disposed thereon.

8. A marcotting device according to claim 7 wherein said predetermined indicia includes at least one of instructions, measurement markings, and a combination thereof.

9. A marcotting device according to claim 1 wherein said device further includes a first locking means engageable with said side members for enabling a user to selectively lock such housing member in such closed position.

10. A marcotting device according to claim 1 wherein a handle member is disposed on an outside portion of a predetermined one of said side members at a predetermined location.

11. A marcotting device according to claim 1 wherein said device further includes a shutter member hingedly attached to said housing member closely adjacent said second aperture such that said shutter member may be selectively opened and closed by a user.

12. A marcotting device according to claim 11 wherein said device further includes a second locking means engageable with said housing member closely and said shutter member for enabling said user to selectively lock said shutter member in a closed position covering said second aperture.

13. A marcotting device according to claim 1 wherein at least one of said bottom members further includes a second plurality of apertures disposed there through for permitting water to pass there through and out of such interior portion of said housing member.

14. A marcotting device according to claim 1 wherein said at least one securing means is at least one of a screw type securing means, a strap type securing means, and a combination thereof.

15. A method of using a marcotting device includes the steps of:
   a. providing a marcotting device including;
      i. a generally hollow housing member manufactured from a first predetermined material and having a first predetermined size and a first predetermined shape for housing a predetermined portion of a predetermined branch of a predetermined plant therein;
      ii. two side members hingedly attached to each other for enabling a user to open said housing member to gain access to an interior thereof;
      iii. an open first end formed when said two side members of said housing member are joined in a closed position;
      iv. a pair of bottom members, a first one of said bottom members being perpendicularly attached to a first side member closely adjacent a second end thereof and a second one of said bottom members being perpendicularly attached to a second side member closely adjacent a second end thereof, each of said bottom members including a cut out portion such that when said side members are joined in a closed position said bottom members are aligned to form a bottom of said housing member and said cut out portions of said bottom members are aligned to form a first aperture for encircling a lower portion of said predetermined portion of said predetermined branch;
      v. a cover member having a second predetermined shape and a second predetermined size for releasably fitting within said housing member and being engageable thereto closely adjacent said first open end thereof said cover member fitting at least partially around an upper portion of said predetermined portion of said predetermined branch;
      vi. a second aperture disposed through a predetermined one of said side members and said second aperture includes a lip member extending outwardly along a predetermined portion of a perimeter thereof in a flared manner; and
      vii. a securing means engageable with at least one of said housing member, said predetermined branch, and a combination thereof, for securing said housing member at least one of on said predetermined branch, to said predetermined branch, around said predetermined branch, and a combination thereof;
   b. choosing a predetermined branch on a predetermined plant;
   c. making about a four inch girdle on a predetermined portion of said predetermined branch;
   d. positioning said predetermined girdled portion of said predetermined branch within an interior portion of said marcotting device;
   e. securing said marcotting device to said predetermined branch via said securing means;
   f. providing a predetermined amount of at least one of soil, fertilizer, and a combination thereof;
   g. packing said predetermined amount of said at least one of said soil, said fertilizer, and said combination thereof around said predetermined girdled portion of said predetermined branch;
   h. closing said side members of said housing member;
   i. attaching said cover member to said housing member;
   j. providing a predetermined amount of water;
   k. introducing a predetermined amount of water into said interior portion of said housing member;
   l. continuing to introduce a predetermined amount of water into said interior portion of said housing member according to a predetermined schedule for a predetermined time period until roots have sprouted and grown from said predetermined portion of said predetermined branch to a predetermined length;
   m. removing said marcot device from said marcot branch;
   n. cutting said marcot branch just below said roots such that said marcot branch is disengaged from said predetermined branch just below said roots of said marcot branch; and
   o. planting said marcot branch in a predetermined location.

* * * * *